US012298847B2

(12) United States Patent
Jeon et al.

(10) Patent No.: US 12,298,847 B2
(45) Date of Patent: *May 13, 2025

(54) TRACKING HOST-PROVIDED METADATA IN A MEMORY SUB-SYSTEM (71) Applicant: Micron Technology, Inc., Boise, ID (US)

(72) Inventors: Seungjune Jeon, Santa Clara, CA (US); Juane Li, Milpitas, CA (US); Ning Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,532

(22) Filed: Apr. 12, 2023

(65) Prior Publication Data

US 2023/0251927 A1 Aug. 10, 2023

Related U.S. Application Data (63) Continuation of application No. 17/464,449, filed on Sep. 1, 2021, now Pat. No. 11,636,008.

(51) Int. Cl.
*G06F 11/10* (2006.01)
(52) U.S. Cl.
CPC ...... *G06F 11/1004* (2013.01); *G06F 11/1068* (2013.01)
(58) Field of Classification Search
None
See application file for complete search history.

(56) References Cited

U.S. PATENT DOCUMENTS

| 5,325,375 | A | * | 6/1994 | Westberg | G06F 11/1056 714/E11.051 |
| 9,110,835 | B1 | | 8/2015 | Call et al. | |
| 9,569,306 | B1 | * | 2/2017 | Camp | G06F 11/1012 |
| 10,437,670 | B1 | * | 10/2019 | Koltsidas | G11C 29/52 |
| 10,867,663 | B2 | | 12/2020 | Ho | |
| 11,177,012 | B1 | * | 11/2021 | Avraham | H03M 13/235 |
| 2006/0294447 | A1 | * | 12/2006 | Mackey | G06F 11/1008 714/752 |
| 2007/0033514 | A1 | * | 2/2007 | Ogawa | G06F 11/1032 714/801 |
| 2011/0072028 | A1 | | 3/2011 | Rousseau | |
| 2014/0006879 | A1 | | 1/2014 | Rangarajan | |

(Continued)

OTHER PUBLICATIONS

PCT International Search Report and Written Opinion for International Application No. PCT/US2022/042260, mailed Dec. 21, 2022, 10 pages.

(Continued)

*Primary Examiner* — Daniel F. McMahon
(74) *Attorney, Agent, or Firm* — Lowenstein Sandler LLP (57) ABSTRACT

A request to write host data to a memory device of a memory sub-system is received. Redundancy metadata associated with the host data is generated. A determination of a first status associated with the host data is made. The redundancy metadata associated with the host data is updated to indicate at least the first status associated with the host data. A memory access operation is performed to write the host data and the updated redundancy metadata to the memory device.

20 Claims, 6 Drawing Sheets

(56) References Cited

U.S. PATENT DOCUMENTS

| | | | |
|---|---|---|---|
| 2014/0095956 A1* | 4/2014 | Ozdemir | H03M 13/2778 |
| | | | 714/755 |
| 2015/0098263 A1* | 4/2015 | Hirayama | G11C 11/2275 |
| | | | 365/145 |
| 2016/0085622 A1* | 3/2016 | Andre | G06F 11/1048 |
| | | | 714/764 |
| 2017/0068537 A1 | 3/2017 | Ramanujan et al. | |
| 2017/0097773 A1* | 4/2017 | Camp | G06F 12/0246 |
| 2017/0170845 A1* | 6/2017 | Cho | H03M 13/3761 |
| 2018/0165036 A1 | 6/2018 | Lesartre et al. | |
| 2018/0253389 A1 | 9/2018 | Gove | |
| 2018/0267893 A1* | 9/2018 | Barzik | G06F 12/0246 |
| 2019/0310910 A1* | 10/2019 | Kwak | H03M 13/1575 |
| 2019/0340121 A1* | 11/2019 | Pletka | G06F 3/0679 |
| 2020/0210276 A1* | 7/2020 | Sullivan | G06F 11/1654 |
| 2020/0250033 A1* | 8/2020 | Xie | G06F 12/023 |
| 2021/0141692 A1* | 5/2021 | Agarwal | H03M 13/19 |
| 2021/0303397 A1* | 9/2021 | Lin | H03M 13/458 |

OTHER PUBLICATIONS

A. A. McEwan and I. Mir, "An Embedded FTL for SSD RAID," 2015 Euromicro Conference on Digital System Design, 2015, pp. 575-582, doi: 10.1109/DSD.2015.39. (Year: 2015).

M. Qin, R. Mateescu, Q. Wang, C. Guyot, D. Vucinic and Z. Sandie, "Garbage Collection Algorithms for Meta Data Updates in NANO Flash," ICC 2019—2019 IEEE International Conference on Communications (ICC), 2019, pp. 1-5, doi: 10.1109/ICC. 2019.8761562. (Year: 2019).

\* cited by examiner

TRACKING HOST-PROVIDED METADATA IN A MEMORY SUB-SYSTEM

RELATED APPLICATIONS

This application is a continuation of U.S. patent application Ser. No. 17/464,449, filed Sep. 1, 2021, the entire contents of which is hereby incorporated by reference herein.

TECHNICAL FIELD

Embodiments of the disclosure relate generally to memory sub-systems, and more specifically, relate to tracking host-provided metadata in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to tracking host-provided metadata in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information.

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell may be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data. Metadata can also include error handling data (e.g., ECC codeword, parity code), data version (e.g., used to distinguish age of data written), valid bitmap (specifying which LBAs contain valid data), etc.

In some instances, a host system can provide the memory sub-system controller with information indicating a status of host data that is programmed, or to be programmed, to a memory device. For example, a host system can determine that host data that is to be programmed to a memory device is invalid and/or corrupted. The host system can transmit a request to write the invalid data to the memory device, as described above, and can indicate to the memory sub-system controller that the host data of the write request is invalid. In some systems, the indication of the validity of the host data can be referred to as "memory poisoning" or "data poisoning." In such systems, the host data can be referred to as "poisoned host data" or "poisoned data." The memory sub-system controller can provide the indication of the status with the host data in response to a memory access request (e.g., a read request) from the host system.

As host systems and memory sub-systems become more advanced and complex, the overall storage capacity of a memory sub-system can be significantly large and/or the size of a unit of data that is accessible to a host system can be significantly small. For example, in some instances, an overall storage capacity of a memory sub-system include several terabytes (TB) of memory space and the size of a unit of data that is accessible to a host system can correspond to tens of byes of memory space. In order to provide the indication of the status associated with each unit of host data to the host system, a memory sub-system controller can store an indication of the status of each unit of host data (e.g., in a data structure, etc.) and can retrieve the status associated with a respective unit of host data in response to receiving a memory access request. Given that the size of a host-accessible unit of data can be significantly small and/or the overall storage capacity of a memory sub-system can be significantly large, the memory sub-system controller can store a significant number of host data statuses (e.g., thousands, millions, etc.) at the memory sub-system. Storing the significant number of host statuses at the memory sub-system can reduce an overall amount of storage space that is available to store host data at the memory sub-system. In addition, for each memory access request that is received from the host system, the memory sub-system controller accesses a data structure and/or another portion of the memory sub-system to determine and/or store the status of the host data that is subject to the memory access request. Accessing the data structure and/or another portion of the memory sub-system in response to each memory access request received from the host system can consume a significant amount of overall system resources (e.g., processing cycles, etc.), which can decrease an overall efficiency and increase an overall latency of the memory sub-system.

Aspects of the present disclosure address the above and other deficiencies by providing a scheme for tracking host-provided metadata in a memory sub-system. A host system can transmit a request to program host data to a memory device of a memory sub-system. In some embodiments, the request can include metadata that indicates a status associated with the host data. For example, the request can include metadata that indicates whether the host data is invalid and/or corrupted. A controller for the memory sub-system can receive the request and can generate redundancy metadata associated with the host data. Redundancy metadata refers to data that can be used by the memory sub-system controller to reconstruct or recalculate the data after a failed memory access operation. In some embodiments, redundancy metadata can include parity data including one or more parity bits. In some embodiments, the memory sub-system controller can generate redundancy metadata associated with the host data by applying an exclusive-or (XOR) operation to the host data and an address (e.g., a logical address, a physical address, etc.) associated with a portion of a memory device of the memory sub-system that is to store the host data.

The memory sub-system controller can determine the status associated with the host data. In some embodiments, the memory sub-system controller can determine the status associated with the host data in view of the request received from the host system (e.g., in view of the metadata of the request that indicates whether the host data is invalid and/or corrupted). In response to determining that the host data is invalid and/or corrupted data (i.e., "poisoned" data), the memory sub-system controller can update the redundancy metadata associated with the host system to indicate that the host data is invalid and/or corrupted. As described above, the redundancy metadata can include parity data which includes one or more parity bits. The memory sub-system controller can update the redundancy metadata by inverting or flipping the one or more parity bits (e.g., from "1" to "0," from "0" to "1," etc.). In an illustrative example, the redundancy metadata generated for the host data can be "0000 0000." Responsive to determining that the host data is invalid and/or corrupted, the memory sub-system controller can update the redundancy metadata to be "1111 1111." The memory sub-system controller can store the host data and the updated redundancy metadata to a portion of a memory device at the memory sub-system. In some embodiments, the memory sub-system controller can determine that the host data is valid data (e.g., in view of the request). In such embodiments, the memory sub-system controller can store the host data and the original redundancy metadata to a portion of the memory device. In accordance with the previous example, responsive to determining that the host data is valid data, the memory sub-system controller can store the host data and the redundancy metadata generated for the host data (e.g., "0000 0000") to a portion of a memory device.

The host system can transmit a request (e.g., a read request) to access host data programmed to a memory device of the memory sub-system. In some embodiments, the memory sub-system controller can obtain the host data and redundancy metadata associated with the host data (e.g., by executing a memory operation at a portion of the memory device that stores the host data). In accordance with at least one previous example, the redundancy metadata stored with the host data at the portion of the memory device can be "1111 1111." The memory sub-system controller can generate redundancy metadata associated with the host data based on the host data and an address (e.g., a logical address, a physical address, etc.) associated with a portion of the memory device that stores the host data. In some embodiments, the memory sub-system can generate the redundancy metadata using the same or a similar technique or process that was used to generate the redundancy metadata when the host data was programmed to the memory device (e.g., by applying an XOR operation to the host data and the address). In one example, the redundancy metadata generated by the memory sub-system controller can be "0000 0000." The memory sub-system controller can also determine an updated version (e.g., a flipped or an inverted version) of the generated redundancy metadata. In accordance with the previous example, the memory sub-system controller can determine that the updated version of the generated redundancy metadata is 1111 1111."

The memory sub-system controller can determine a status of the obtained host data based on the redundancy metadata stored with the host data and the updated version of the redundancy metadata generated for the host data. For example, if the obtained redundancy metadata corresponds to the updated version of the generated redundancy metadata, this can indicate that the redundancy metadata generated when the host data was programmed to the memory device was updated to indicate that the host data is not valid data. Accordingly, the memory sub-system controller can determine whether the obtained redundancy metadata (e.g., "1111 1111") corresponds to the updated version of the generated redundancy metadata (e.g., "1111 1111"). Responsive to determining that the obtained redundancy metadata corresponds to the updated version of the generated redundancy metadata, the memory sub-system controller can determine that the host data is invalid data. In response to determining that the obtained redundancy metadata corresponds to the generated redundancy metadata, the memory sub-system controller can determine that the host data is valid data. The memory sub-system controller can provide the host data and the indication of the host data status (e.g., valid data, invalid data, etc.) to the host system in accordance with the request to access the host data.

Advantages of the present disclosure include, but are not limited to, providing a scheme that minimizes the amount of space and system resources consumed to track the host-provided metadata. As indicated above, embodiments of the present disclosure provide that a memory sub-system controller can update redundancy metadata generated for host data to indicate a status of the host data (e.g., by flipping one or more parity bits of the generated redundancy metadata) and store the updated redundancy metadata with the host data at a memory device. By updating the redundancy metadata associated with the host data to indicate the status of the host data, the memory sub-system leverages metadata that is already generated for and stored with host data to track the host data status. Accordingly, the memory sub-system does not store the status associated with each unit of host data in a data structure or another portion of memory sub-system, which increases the amount of storage space that is available to store host data and/or other data at the memory sub-system. In addition, the memory sub-system controller can determine the status of the host data based on the redundancy metadata that is stored with the host data rather than accessing a data store and/or another portion of the memory sub-system. As the memory sub-system controller does not access a data store and/or another portion of the memory sub-system, the memory sub-system controller does not consume excess system resources (e.g., processing cycles) to determine and/or store the status of a respective unit of host data. Accordingly, an overall efficiency of the memory sub-system increases and an overall latency of the memory sub-system decreases.

Figure 1:
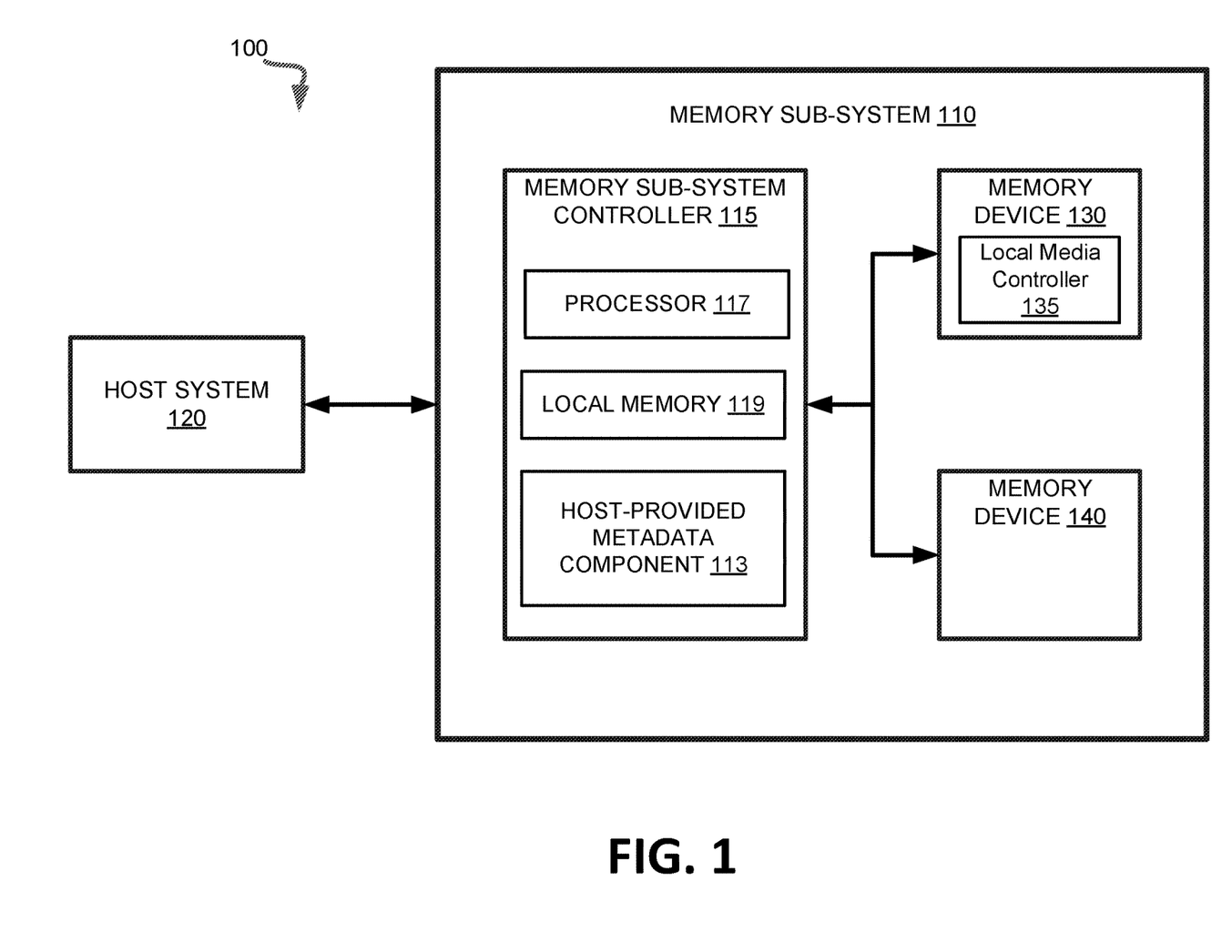
FIG. 1 illustrates an example computing system that includes a memory sub-system, in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell.

Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135f) on the die and a controller (e.g., memory sub-system controller 115) for media management within the same memory device package. An example of a managed memory device is a managed NAND (MNAND) device.

The memory sub-system 110 includes a host-provided metadata component 113 that can manage redundancy data generated for host data stored at one or more portions of a memory device 130, 140. In some embodiments, the memory sub-system controller 115 includes at least a portion of the host-provided metadata component 113. For example, the memory sub-system controller 115 can include a processor 117 (processing device) configured to execute instructions stored in local memory 119 for performing the operations described herein. In some embodiments, the host-provided metadata component 113 is part of the host system 120, an application, or an operating system.

Host-provided metadata component 113 can be configured to implement a scheme for tracking host-provided metadata in a memory sub-system 110. In some embodiments, host system 120 can transmit a request to memory sub-system 110 to program host data to a memory device 130, 140. Host-provided metadata component 113 can generate redundancy metadata (e.g., parity data) for the host data. In some embodiments, host-provided metadata component 113 can determine a status associated with the host data (e.g., based on the request received from host system 120). For example, host-provided metadata component 113 can determine, based on metadata included in the request to program host data to memory device 130, 140, whether the host data is valid data or invalid data. Host-provided metadata component 113 can generate updated redundancy metadata associated with the host data to indicate the status of the host data (e.g., to indicate that the host data is invalid data)

and store the host data and the updated redundancy metadata at a portion of memory device 130, 140, in some embodiments.

In some embodiments, host system 120 can transmit a request to memory sub-system 110 to access the host data stored at the portion of memory device 130, 140. Host-provided metadata component 113 can obtain the host data and redundancy metadata associated with the host data from the portion of memory device 130, 140 (e.g., by performing a read operation). In some embodiments, host-provided metadata component 113 can generate redundancy metadata associated with the host data obtained from the portion of memory device 130, 140. For example, host-provided metadata component 113 can perform one or more operations to generate parity data based on the obtained host data and an address (e.g., a logical address, a physical address, etc.) associated with the portion of memory device 130, 140 that stores the host data. Host-provided metadata component 113 can compare an updated version (e.g., an inverted version or a flipped version) of the redundancy metadata stored with the host data with the redundancy metadata generated based on the obtained host data to determine a status of the host data. For example, responsive to determining that the updated version of the redundancy metadata corresponds to the redundancy metadata stored with the obtained host data, host-provided metadata component 113 can determine that the host data is invalid data. Host-provided metadata component 113 can provide the host data and an indication of the status of the host data to host system 120, in some embodiments. Further details regarding the host-provided metadata component 113.

Figure 2:
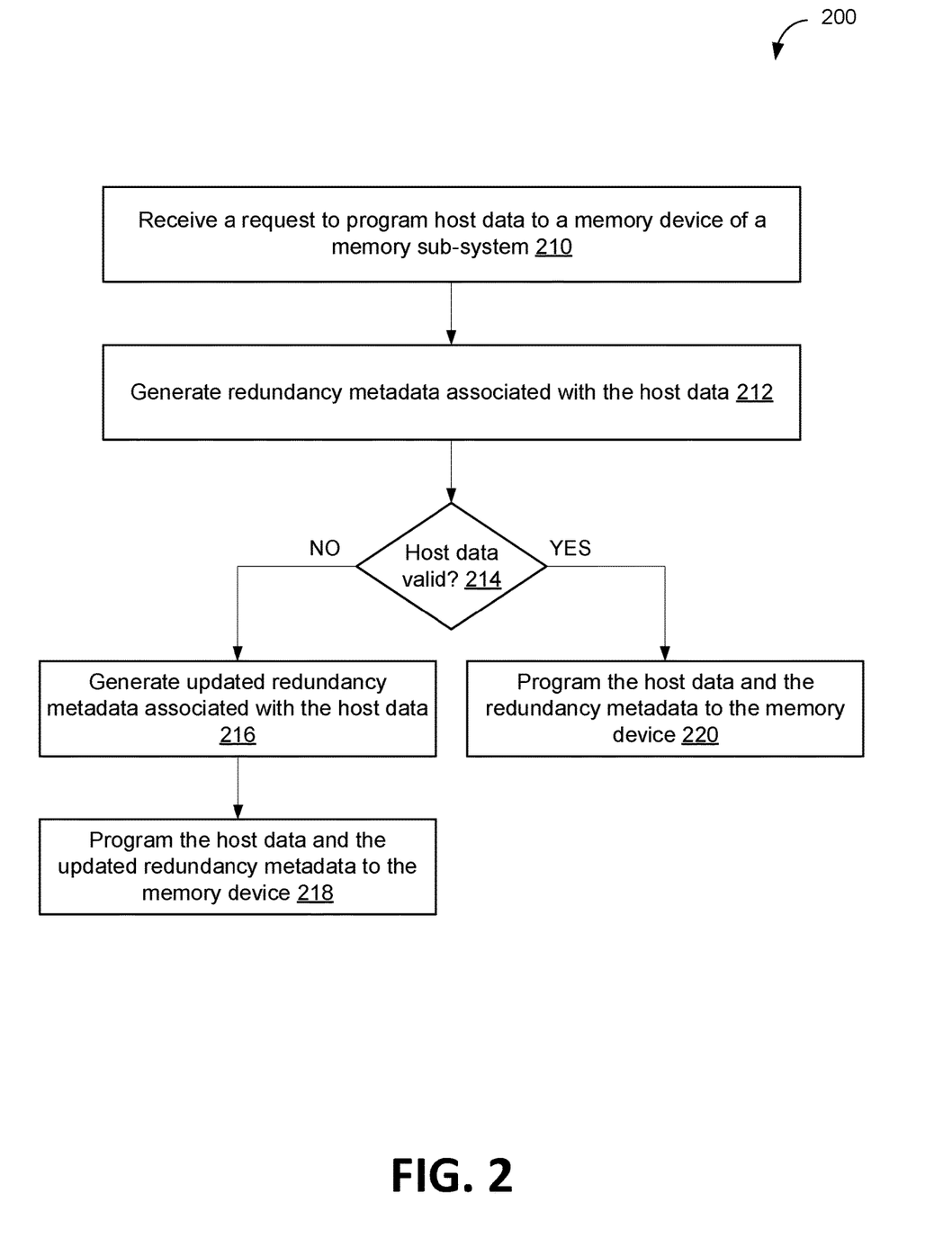
FIG. 2 is a flow diagram for tracking host-provided metadata associated with host data, in accordance with some embodiments of the present disclosure.

FIG. 2 is a flow diagram for tracking host-injected metadata associated with host data, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the host-provided metadata component 113 of FIG. 1. In other or similar embodiments, one or more operations of method 200 is performed by another component of the memory sub-system controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3A:
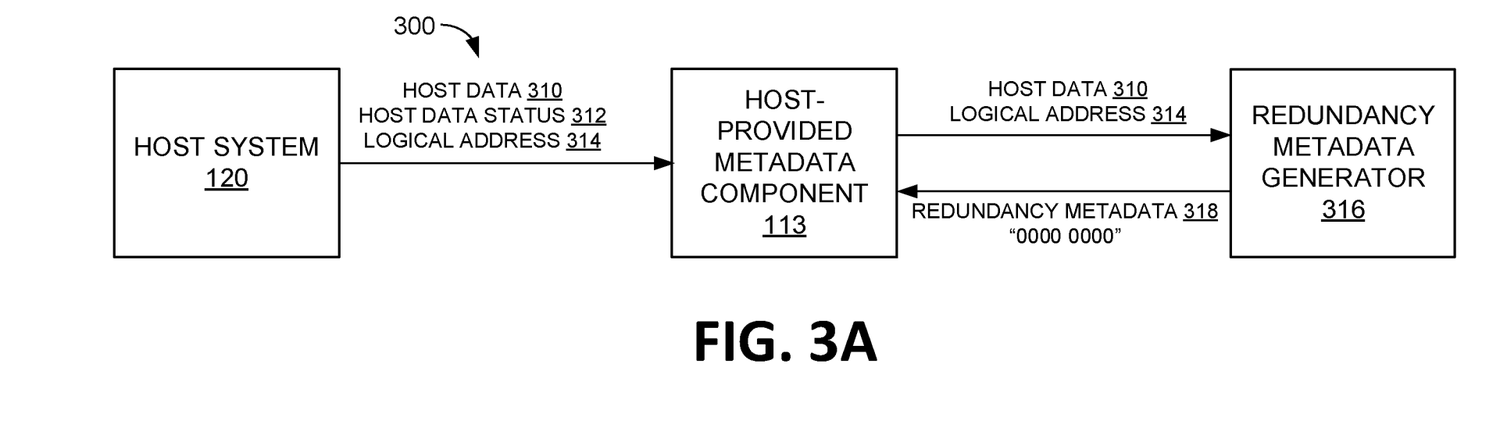
FIGS. 3A-3B depict an example of tracking host-provided metadata associated with host data, in accordance with some embodiments of the present disclosure.

At block 210, processing logic receives a request to program host data to a memory device of a memory sub-system. In some embodiments, the request can be a request to perform a write command to write the host data to a portion of a memory device 130, 140 of memory sub-system 110. The request can include an indication of a logical address associated with the portion of memory device 130, 140 to store the host data, in some embodiments. In additional or alternative embodiments, the request can include an indication of a status of the host data. For example, as described above, the request can include metadata that indicates whether the host data is valid data or invalid data (e.g., "poisoned" data). FIG. 3A depicts an example of tracking host-provided metadata, in accordance with embodiments of the present disclosure. As illustrated in FIG. 3A, host system 120 can transmit a request 300 to a memory sub-system 110. The request 300 can include host data 310 and, in some embodiments, metadata indicating a host data status 312 and/or a logical address 314 associated with a portion of memory device 130, 140 that is to store host data 310. Host data status 312 can indicate whether host data 310 is valid data or invalid data, in some embodiments. For example, host data status 312 can include a bit (e.g., a validity bit or a "poison" bit) that indicates whether host data 310 is "poisoned" (e.g., set to "1") or not "poisoned" (e.g., set of "0"). Host-provided metadata component 113 (i.e., at memory sub-system 110) can receive request 300, as described above.

It should be noted that although embodiments of the present disclosure provide that request 300 can include host data status 312 and/or logical address 314, host-provided metadata component 113 can obtain host data status 312 and/or logical address 314 in accordance with other techniques. For example, host-provided metadata component 113 can obtain host data status 312 and/or logical address 314 based on one or more data structures (e.g., maintained by host-provided metadata component 113, another component of memory sub-system controller 115, and/or local media controller 135, etc.). In another example, host-provided metadata component 113 can receive one or more notifications from host system 120 (i.e., separate from request 300) where the one or more notifications include an indication of host data status 312 and/or logical address 314.

Referring back to FIG. 2, at block 212, processing logic generates redundancy metadata associated with the host data 310. In some embodiments, processing logic can generate the redundancy data based on host data 310 and an address associated with a portion of memory device 130, 140 that is to store host data 310 (e.g., logical address 314, a physical address, etc.). As illustrated in FIG. 3A, in some embodiments, host-provided metadata component 113 can provide host data 310 and the address (e.g., logical address 314) to a redundancy metadata generator 316. Redundancy metadata generator 316 can generate redundancy metadata 318 by applying one or more functions or operations (e.g., an XOR operation) to host data 310 and the address, in some embodiments. For example, redundancy metadata generator 316 can apply an XOR operation to host data 310 and logical address 314 to generate redundancy metadata 318. In some embodiments, redundancy metadata 318 can include parity data, which includes one or more parity bits. In an illustrative example, the redundancy metadata 318 generated by redundancy metadata generator 316 can be "0000 0000," as illustrated in FIG. 3A. It should be noted that FIG. 3A depicts redundancy metadata generator 316 to be separate from host-provided metadata component 113. For example, in some embodiments, memory sub-system controller 115 can include host-provided metadata component 113 and redundancy metadata generator 316 can reside on a local media controller (e.g., local media controller 119). In other or similar embodiments, redundancy metadata generator 316 can be or can be included at another component of memory sub-system controller 115. In some embodiments, redundancy metadata generator 316 can be a module or a component of host-provided metadata component 113.

Referring back to FIG. 2, at block 214, processing logic determines whether the host data is valid data or invalid data. In some embodiments, processing logic can determine whether the host data is valid data or invalid data based on host data status 312 (e.g., included in request 300). For example, processing logic can determine that a validity bit or a "poison" bit of host data status 312 is set to a particular value (e.g., "1") associated with invalid or "poisoned" data. Accordingly, processing logic can determine that host data 310 is invalid or "poisoned" data. In another example, processing logic can determine that the validity bit or the "poison" bit of host data status 312 is set to a particular value (e.g., "0") associated with valid data. Accordingly, processing logic can determine that host data 310 is valid.

Figure 3B:
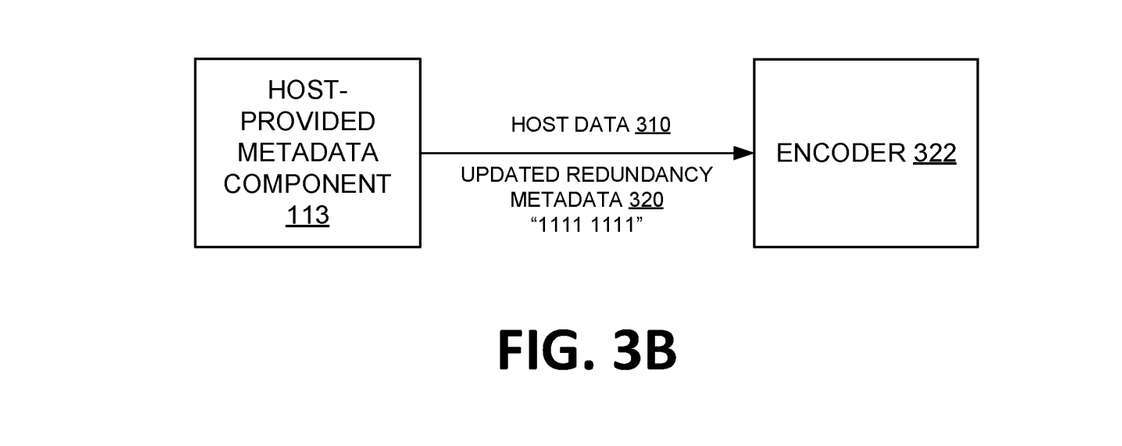

In response to processing logic determining that the host data is invalid data, method 200 can proceed to block 216. At block 216, processing logic can generate updated redundancy metadata associated with the host data. The updated redundancy metadata can indicate that the host data is invalid, in accordance with embodiments provided herein. As described above, redundancy metadata 318 can include parity data, which includes one or more parity bits. For example, as described with respect to FIG. 3A, redundancy metadata 318 (e.g., generated by redundancy metadata generator 316) can be "0000 0000." Host-provided metadata component 113 can generate updated redundancy metadata by flipping or inverting the one or more parity bits of redundancy metadata 318. As illustrated in FIG. 3B, host-provided metadata component 113 can generate updated redundancy metadata 320 by flipping or inverting the one or more parity bits of redundancy metadata 318. For example, host-provided metadata component 113 can flip the one or more parity bits of redundancy metadata 318 from "0000 0000" to "1111 1111."

Referring back to FIG. 2, at block 218, processing logic programs the host data and the updated redundancy metadata to memory device 130, 140. In some embodiments, memory sub-system controller 115 can allocate a particular amount of space of memory device 130, 140 to store host data 310 and metadata associated with host data 310. For example, a particular amount of space can be allocated to store host data 310 and redundancy metadata associated with host data 310. Host-provided metadata component 113 can store the host data 310 and the updated redundancy metadata 320 at a set of memory cells that correspond to the allocated amount of space, in some embodiments. The set of memory cells can correspond to logical address 314, in some embodiments. In accordance with one or more previous examples, host-provided metadata component 113 can program host data 310 and updated redundancy metadata (e.g., "1111 1111") to the set of memory cells.

In some embodiments, host-provided metadata component 113 can provide host data 310 and updated redundancy metadata 320 to an encoder before host data 310 and updated redundancy metadata 320 is programmed to the set of memory cells. For example, as illustrated in FIG. 3B, host-provided metadata component 113 can provide host data 310 and updated redundancy metadata 320 to encoder 322. Encoder 322 can be configured to generate additional redundancy metadata associated with host data 310. For example, encoder 322 can apply an XOR operation to host data 310 and updated redundancy metadata 320 to generate an encoded version of host data 310 and updated redundancy metadata 320. The encoded version of host data 310 and updated redundancy metadata 320 can be used (e.g., by memory sub-system controller 115) to perform one or more error correction operations in the event of a failure at the set of memory cells that stores host data 310 and updated redundancy metadata 320. In some embodiments, encoder 322 can be an error correction code (ECC) encoder.

Responsive to generating the encoded version of host data 310 and updated redundancy metadata 320, host-provided metadata component 113 can program the encoded version of host data 310 and updated redundancy metadata 320 to the set of memory cells of memory device 130, 140, as described above. It should be noted that FIG. 3B depicts encoder 222 to be separate from host-provided metadata component 113. For example, encoder 222 can be a component of another controller residing at memory sub-system 110 (e.g., local media controller 119). In another example, encoder 222 can be another component of memory sub-system controller 115. In some embodiments, encoder 222 can be a module or a component of host-provided metadata component 113.

As described above with respect to FIG. 2, at block 214, processing logic can determine whether host data is valid data or invalid data. Responsive to processing logic determining that host data is valid data, method 200 can proceed to block 220. At block 220, processing logic programs the host data and the redundancy metadata to the memory device 130, 140. In accordance with one or more illustrative examples, redundancy metadata 318 generated for host data 310 can be "0000 0000." In such embodiments, processing logic can program host data 310 and redundancy metadata 318 to memory device 130, 140, as described above. In some embodiments, host-provided metadata component 113 can provide host data 310 and redundancy metadata 318 to encoder 322, as described above. In such embodiments, host-provided metadata 113 can program the encoded version of host data 310 and redundancy metadata 318 to memory device 130, 140, in accordance with previously described embodiments.

Figure 4:
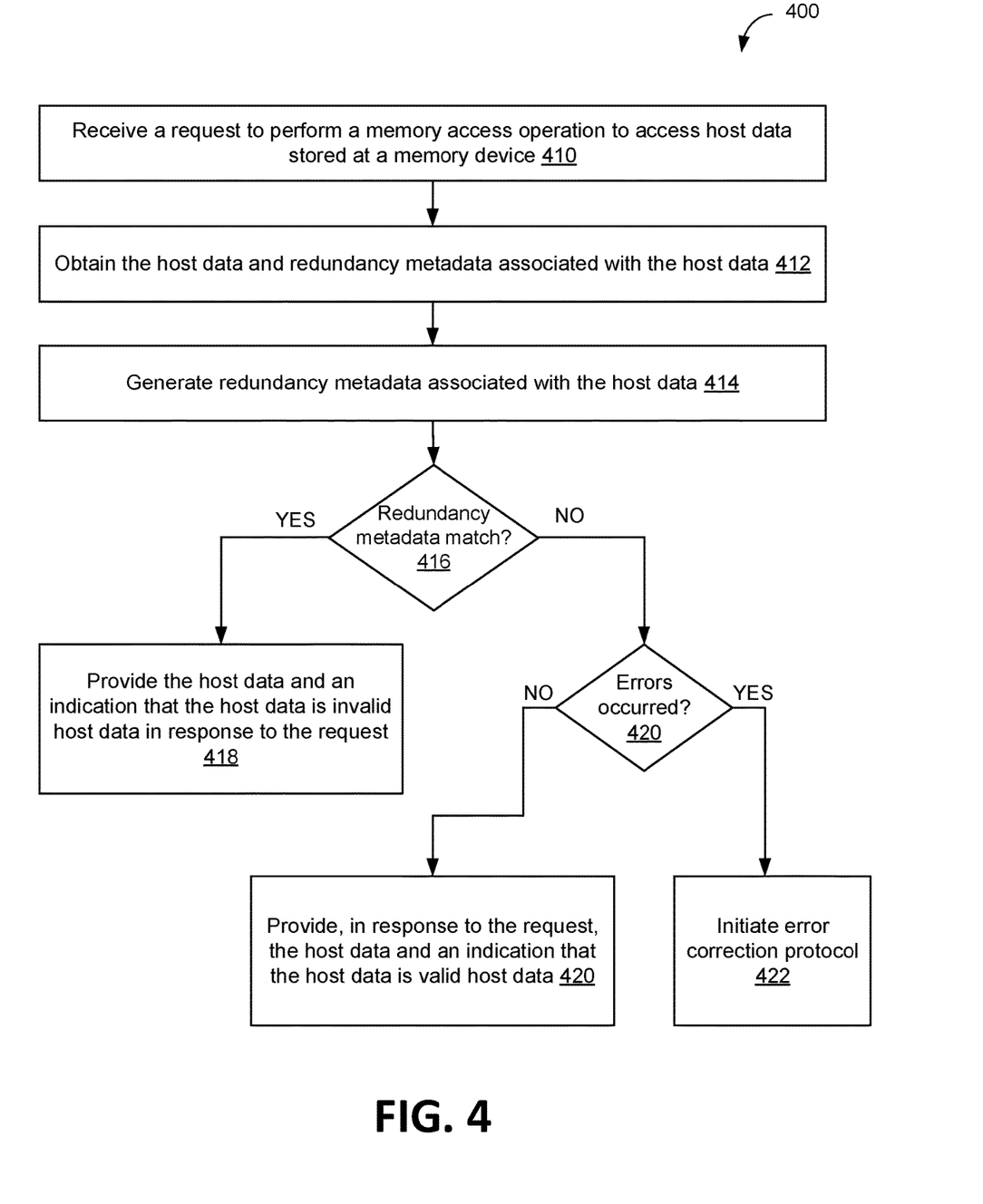
FIG. 4 is a flow diagram for providing host-provided metadata associated with host data to a host system, in accordance with some embodiments of the present disclosure.

FIG. 4 is a flow diagram for providing host-injected metadata associated with host data to a host system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the host-provided metadata component 113 of FIG. 1. In other or similar embodiments, one or more operations of method 400 is performed by another component of the memory sub-system controller, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, processing logic receives a request to perform a memory access operation to access host data at a memory device. In some embodiments, the request can be a request to perform a read command to read the host data from the portion of the memory device 130, 140. The request can include, in some embodiments, an address (e.g., a logical address) associated with the portion of memory device 130, 140 that stores the host data.

Figure 5A:
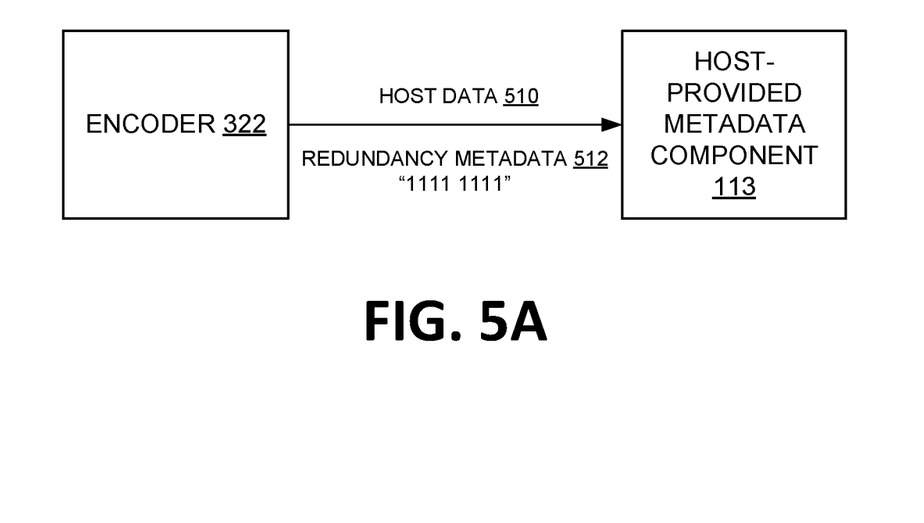
FIGS. 5A-5B depict an example providing host-provided metadata associated with host data to a host system, in accordance with some embodiments of the present disclosure.

At block 412, processing logic can obtain the host data and redundancy metadata associated with the host data. In some embodiments, processing logic can obtain the host data and the redundancy metadata by performing a read operation at a set of memory cells of memory device 130, 140 associated with the address included in the request. As described with respect to FIG. 3B, in some embodiments, an encoded version of the host data and the redundancy metadata can be stored at the set of memory cells associated with the address included in the request. In such embodiments, processing logic can provide the encoded version of the host data and the redundancy metadata to an encoder (e.g., encoder 322) to decode the host data and the redundancy metadata. For example, encoder 322 can perform an XOR operation based on the encoded version of the host data and the redundancy metadata data to obtain the decoded host data and the decoded redundancy metadata. As illustrated in FIG. 5A, encoder 322 can, in some embodiments, provide host data 510 and redundancy metadata 512 to host-provided metadata component 113, in some embodiments. In some embodiments, host data 510 can correspond to host data 310 described with respect to FIGS. 3A-3B. In other or similar embodiments, host data 510 can correspond to different host data.

Figure 5B:
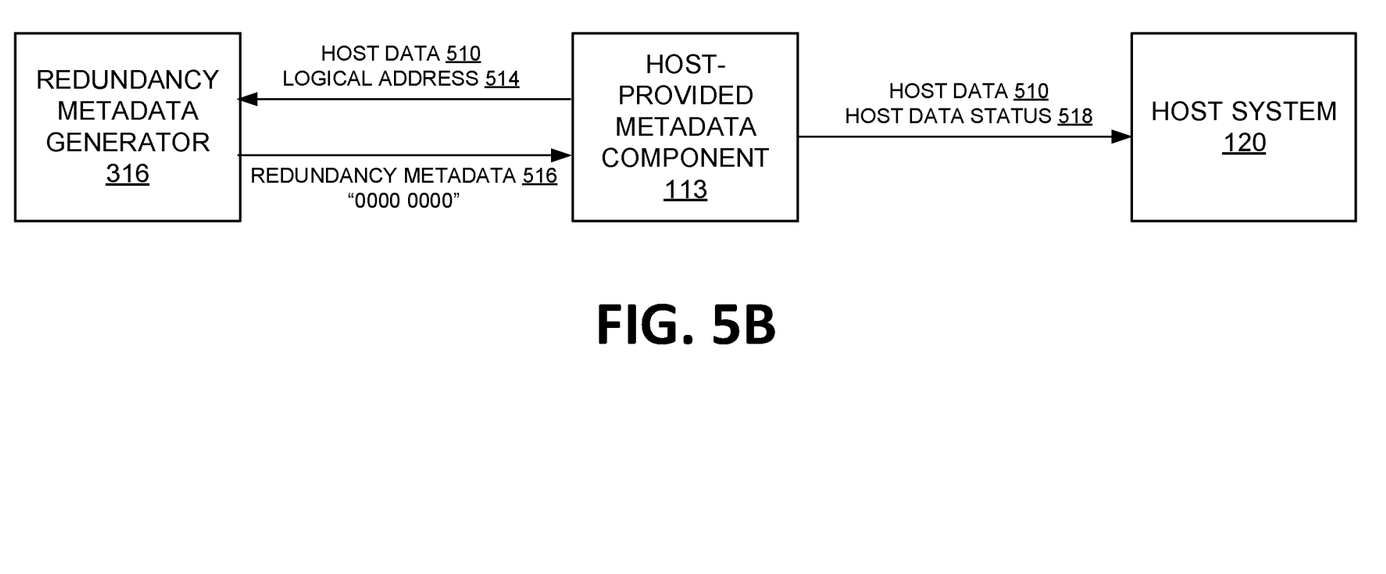

Referring back to FIG. 4, at block 414, processing logic can generate redundancy metadata associated with the host data. In some embodiments, processing logic can generate redundancy metadata based on the same or similar techniques use to generate redundancy metadata 318 described with respect to FIG. 3A. For example, processing logic can apply an XOR operation to obtained host data 510 and an address (e.g., a logical address, a physical address, etc.) associated with a set of cells that stores host data 510. As illustrated in FIG. 5B, host-provided metadata component 113 can provide host data 510 and logical address 514 to redundancy metadata generator 316. Logical address 514 can be a logical address associated with the set of cells that stores host data 510 at memory device 130, 140. Redundancy metadata generator 316 can apply the XOR operation to host data 510 and logical address 514, as described above, to generate redundancy metadata 516. As illustrated in FIG. 5B, redundancy metadata 516 can be "0000 0000."

Referring back to FIG. 4, at block 416, processing logic can determine whether the obtained redundancy metadata corresponds to (e.g., matches or substantially matches) an updated version of the generated redundancy metadata. In some embodiments, processing logic can determine an updated version of the generated redundancy metadata by determining an inverted version or a flipped version of the generated redundancy metadata. For example, as illustrated in FIG. 5B, redundancy metadata 516 can be "0000 0000." Host-provided metadata component 113 can determine that an inverted version or a flipped version of redundancy metadata 516 is "1111 1111." Responsive to determining the updated version of redundancy metadata 516, host-provided metadata component 113 can determine whether the updated version of redundancy metadata 516 corresponds to redundancy metadata 512 that was obtained with host data 510 from the set of memory cells of memory device 130, 140. In accordance with one or more previous examples, host-provided metadata component 113 can determine that the updated version of redundancy metadata 516 (e.g., "1111 1111") corresponds to the redundancy metadata 512 (e.g., "1111 1111").

Responsive to processing logic determining that the obtained redundancy metadata corresponds to the updated version of the generated redundancy metadata, method 400 can proceed to block 418. At block 418, processing logic provides the host data and an indication that the host data is invalid data in response to the request. As described above, in some embodiments, processing logic can receive the request to access the host data from host system 120. In such embodiments, processing logic can provide the host data and the indication that the host data is invalid data to host system 120. For example, as illustrated in FIG. 5B, host system 120 can provide host data 510 and host data status 518 to host system 120.

Referring back to FIG. 4, in some embodiments, at block 416, processing logic can determine that the obtained redundancy metadata (e.g., redundancy metadata 512) does not correspond to the updated version of the generated redundancy metadata (e.g., redundancy metadata 516). In response to processing logic determining that the obtained redundancy metadata does not correspond to the updated version of the generated redundancy metadata, method 400 may proceed to block 420. At block 420, processing logic may determine whether one or more errors occurred during a performance of the memory access operation to access the host data.

In some embodiments, an error during performance of the memory access operation can be detected if the redundancy metadata 512 obtained with host data 510 does not correspond to redundancy metadata 516 generated by redundancy metadata generator 316 and also does not correspond to the updated version of redundancy metadata 516, as described above. Accordingly, processing logic can determine, at block 420, whether one or more errors occurred during performance of the memory access operation by determining whether the redundancy metadata 512 obtained with host data 510 corresponds to redundancy metadata 516 generated by redundancy metadata generator 316. For example, in some embodiments described with respect to FIG. 3A, host-provided metadata component 113 may not generate an inverted version or a flipped version of redundancy metadata 318 (e.g., in response to determining that host data 310 is valid data, as described above). In such example, the redundancy metadata 318 stored with host data 310 at the set of memory cells can be "0000 0000." As described above, host data 310 can correspond to host data 510 of FIGS. 5A-5B, in some embodiments. In such embodiments, redundancy metadata 318 stored with host data 310 can correspond to redundancy data 512 (e.g., "0000 0000"). Host-provided metadata component 113 may obtain host data 510 and redundancy metadata 512 (e.g., "0000 0000") from memory device 130, 140, as previously described. Host-provided metadata component 113 may determine that redundancy metadata 512 (e.g., "0000 0000") corresponds to redundancy metadata 516 (e.g., "0000 0000") generated by redundancy metadata generator 316, and therefore does not correspond to an updated version (i.e., an inverted version or a flipped version) of redundancy metadata 516 (e.g., "1111 1111"). As redundancy metadata 512 is determined to correspond to redundancy metadata 516, host-provided metadata component 113 can determine that no errors have occurred during the performance of the memory access operation to access host data 310.

Referring back to FIG. 4, in response to processing logic determining that one or more errors did not occur during performance of the memory access operation, method 400 may proceed to block 420. As indicated above, processing logic can determine that one or more errors did not occur during performance of the memory access operation if processing logic determines that redundancy metadata 512 obtained with host data 510 at memory device 130, 140 corresponds to redundancy metadata 516 generated by redundancy metadata generator 316. Redundancy data 512 corresponding to redundancy metadata 516 can also indicate that host data 510 is valid data, for at least the reasons provided above. Accordingly, responsive to determining that redundancy metadata 516 corresponds to redundancy metadata 516, processing logic can provide host data 510 and an indication that host data is valid data (e.g., as host data status 518) to host system 120, in accordance with previously described embodiments.

In some embodiments, processing logic can determine, at block 420, that one or more errors occurred during performance of the memory access operation to access host data 510. For example, as described with respect to FIGS. 3A-3B, host-provided metadata component 113 can store host data 310 with redundancy metadata 318 (e.g., "0000 0000") or updated redundancy metadata 320 ("1111 1111"), in accordance with previously described embodiments. Host-provided metadata component 113 can obtain host data 510 (e.g., which corresponds to host data 310) and redundancy metadata 512, in accordance with previously described embodiments. In one example, redundancy metadata 512 obtained from memory device 130, 140 can be "1111 0000." Host-provided metadata component 113 can obtain redundancy metadata 516, in accordance with previously described embodiments. In one example, redundancy metadata 516 generated by redundancy metadata generator 316 can be "0000 0000." Host-provided metadata component 113 can compare obtained redundancy metadata 512 to redundancy metadata 516 and determine that redundancy metadata 512 does not correspond to redundancy metadata 516 or an updated version (e.g., an inverted version or a flipped version) of redundancy metadata 516 (e.g., "1111 0000" does not correspond to "0000 0000" or "1111 1111"). As redundancy metadata 512 does not correspond to redundancy metadata 516 or an updated version of redundancy metadata 516, host-provided metadata component 113 can determine that one or more errors occurred during performance of the memory access operation to access host data 510. Referring back to FIG. 4, responsive to processing logic determining that one or more errors occurred during performance of the memory access operation, method 400 can proceed to block 422. At block 422, processing logic can initiate one or more error correction protocols to correct the one or more errors that occurred during performance of the memory access operation.

It should be noted that although the embodiments described with respect to FIG. 4 provide that processing logic determines whether obtained redundancy metadata 512 corresponds to an updated version of redundancy metadata 516 and if not, whether obtained redundancy metadata 512 corresponds to redundancy metadata 516, other orderings are possible. For example, processing logic can determine whether redundancy metadata 512 corresponds to redundancy metadata 516 and then determine whether redundancy metadata 512 corresponds to an updated version (e.g., an inversed version or a flipped version) of redundancy metadata 516. Responsive to determining that redundancy metadata 512 does not correspond to redundancy metadata 516 or an updated version of redundancy metadata 516, processing logic can determine that one or more errors occurred during the performance of the memory access operation, in accordance with previously described embodiments.

It should also be noted that although some embodiments of the present disclosure are directed to tracking a validity status associated with host data (e.g., whether host data is valid data or invalid data), embodiments of the present disclosure can be used to track other types of statuses associated with host data. In addition, some embodiments of the present disclosure are directed to tracking a single type of status (e.g., a validity status) associated with host data. However, it should be noted that embodiments the present disclosure can be applied to track multiple types of statuses associated with host data. For example, in some embodiments, host system 120 can transmit a request to program host data to a portion of memory device, in accordance with embodiments of the present disclosure. The request can include an indication of a first status associated with the host data (e.g., a validity status) and another status associated with the host data. In response to determining the first status and the second status associated with the host data, host-provided metadata component 113 can update redundancy metadata 318 to indicate both the first status and the second status.

In an illustrative example, the request received by host system 120 can include a first status bit and a second status bit, in accordance with previously described embodiments. The first status bit can be set to "0" or "1" (i.e., to indicate the first status of the host data) and the second status but can be set to "0" or "1" (i.e., to indicate the second status of the host data). Redundancy metadata generator 316 can generate redundancy metadata 318, as described above. In one example, the generated redundancy metadata 318 can be "0000 0000." Host-provided metadata component 113 can identify a first portion of the generated redundancy metadata 318 to correspond to the first status of the host data 310 and a second portion of the generated redundancy metadata 318 to correspond to the second status of the host data 310.

Host-provided metadata component 113 can update the first portion and/or the second portion of the generated redundancy metadata 318 in view of the first status and/or the second status of the host data 310 (e.g., as indicated by the request 300). For example, responsive to determining that the first status bit is set to "0" and the second status bit is set to "1," host-provided metadata component 113 can generate updated redundancy metadata 320 by updating redundancy metadata 318 to be "0000 1111." Responsive to determining that the first status bit is set to "1" and the second status bit is set to "0," host-provided metadata component 113 can generate updated redundancy metadata 320 by updating redundancy metadata 318 to be "1111 0000." Responsive to determining that the first status bit is set to "1" and the second status bit is set to "1," host-provided metadata component 113 can generate updated redundancy metadata 320 by updating redundancy metadata 318 to be "1111 1111."

Host-provided metadata component 113 can store updated redundancy metadata 320 with host data 310, in accordance with previously described embodiments. In some embodiments, host-provided metadata component 113 can determine that the first status bit and the second status bit are set to "0." In such embodiments, host-provided metadata component 113 does not update redundancy metadata 318 and can store redundancy metadata with the host data, in accordance with previously described embodiments. In response to receiving a request to access host data 310, as described with respect to FIGS. 4-5B, host-provided metadata component 113 can obtain redundancy metadata 512, as described above, and determine the first and second status of host data 510, in accordance with previously described embodiments.

Figure 6:
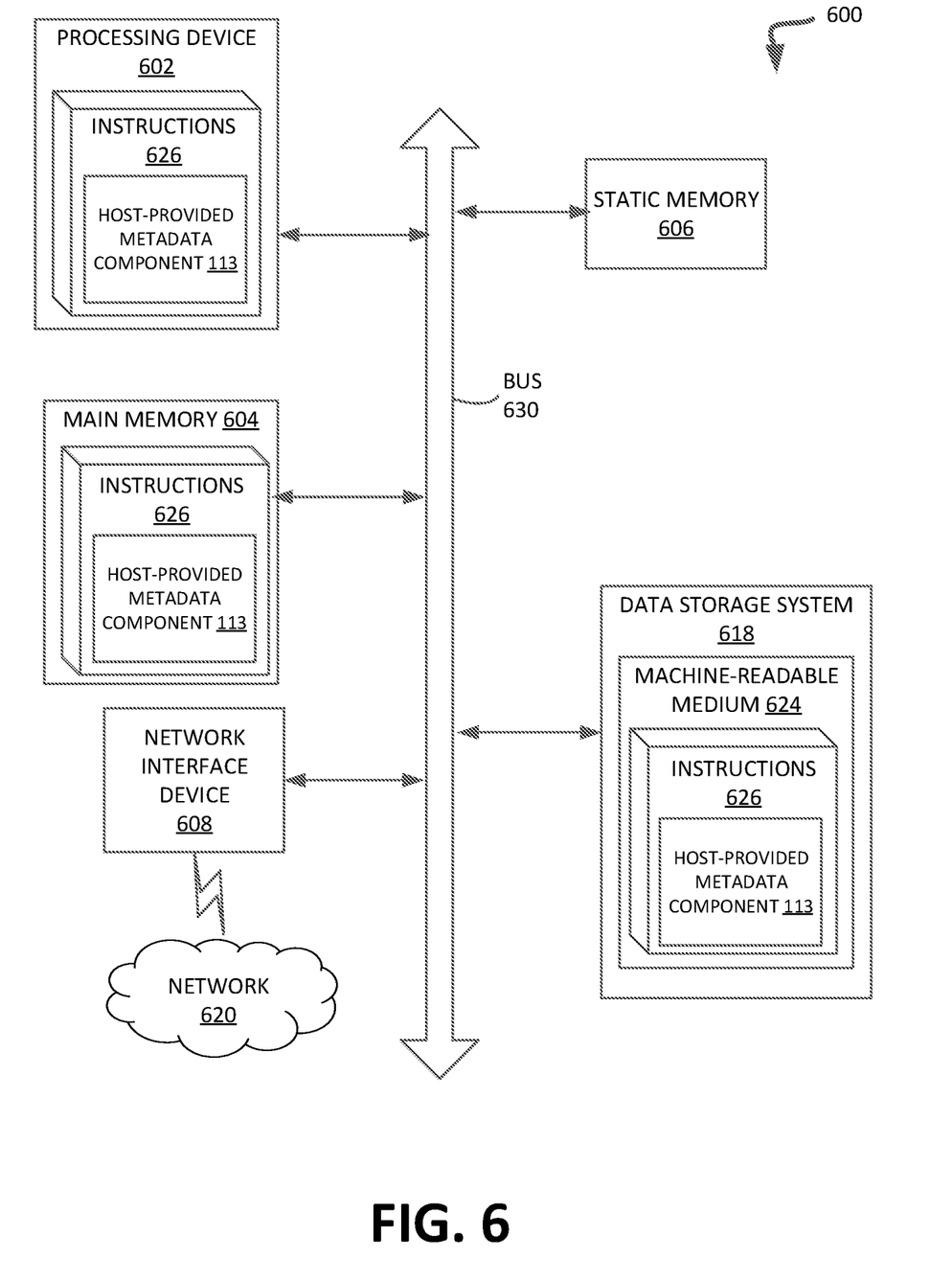
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the host-provided metadata component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a voltage bin boundary component (e.g., the host-provided metadata component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving a request to write host data of a host system, to a memory device of a memory sub-system;
   generating redundancy metadata associated with the host data;
   determining, based on data, obtained from a data structure associated with the memory sub-system, that corresponds to the host data, at least a first status associated with the host data;
   updating the redundancy metadata associated with the host data to indicate at least the first status associated with the host data; and
   performing a memory access operation to write the host data and the updated redundancy metadata to the memory device.

2. The method of claim 1, wherein the redundancy metadata associated with the host data comprises one or more parity bits.

3. The method of claim 2, wherein updating the redundancy metadata associated with the host data comprises:
   inverting the one or more parity bits of the redundancy metadata.

4. The method of claim 1, wherein determining at least the first status associated with the host data comprises:
   determining whether the host data of the received request is valid data or invalid data based on a validity attribute of the received request.

5. The method of claim 4, wherein determining whether the host data of the received request is valid data or invalid data based on the validity attribute of the received request comprises:
   determining whether the received request comprises a notification indicating that the host data is invalid data;
   responsive to determining that the received request comprises the notification indicating that the host data is invalid data, determining that the host data is invalid data; and
   responsive to determining that the received request does not comprise a notification indicating that the host data is invalid data, determining that the host data is valid data.

6. The method of claim 1, further comprising:
   determining one or more second statuses associated with the host data, wherein the redundancy metadata is further updated to indicate the determined one or more second statuses.

7. The method of claim 1, wherein programming the host data and the updated redundancy metadata to the memory device comprises:
   encoding the host data and the updated redundancy metadata based on an error correction mechanism, wherein the encoded host data and encoded redundancy metadata are programmed to the memory device.

8. A system comprising:
   a memory device; and
   a processing device coupled to the memory device, the processing device to perform operations comprising:
      receiving a request to perform a memory access operation to access host data of a host system stored at the memory device;
      obtaining the host data and first redundancy metadata associated with the host data;
      generating second redundancy metadata associated with the host data based on the host data and an address associated with a portion of the memory device that stores the host data;
      determining at least a first status of the host data based on a comparison of the first redundancy metadata to the second redundancy metadata; and
      providing, to the host system in response to the request to perform the memory access operation to access the host data, an indication of at least the determined first status of the host data.

9. The system of claim 8, wherein the first redundancy metadata comprises one or more first parity bits and the second redundancy metadata comprises one or more second parity bits, and wherein each of the one or more second parity bits are inverted from a corresponding parity bit of the one or more first parity bits.

10. The system of claim 8, wherein the at least first status of the host data comprises a validity status of the host data, and wherein determining at least the first status of the host data based on the comparison of the first redundancy metadata to the second redundancy metadata comprises:
    responsive to determining that the first redundancy metadata corresponds to the second redundancy metadata, determining that the host data is valid data; and
    responsive to determining that the first redundancy metadata corresponds to an updated version of the second redundancy metadata, determining that the host data is invalid data.

11. The system of claim 10, wherein the operations further comprise:
    responsive to determining that the first redundancy metadata does not correspond to the updated version of the second redundancy metadata, determining whether one or more errors occurred during a performance of the memory access operation to access the host data; and
    responsive to determining that one or more errors did occur during the performance of the memory access operation, initiating an error correction protocol in view of the one or more errors.

12. The system of claim 11, wherein the operations further comprise:
    providing, in response to the request, an indication of at least the first status determined based on the comparison of the first redundancy metadata to the second redundancy metadata.

13. The system of claim 8, wherein obtaining the host data and first redundancy metadata associated with the host data comprises:
    performing the memory access operation at a portion of the memory device that stores the host data and the first redundancy metadata; and
    decoding the host data and the first redundancy metadata based on an error correction mechanism.

14. A non-transitory computer-readable storage medium comprising instructions that, when executed by a processing device, cause the processing device to perform operations comprising:
- receiving a request to write host data of a host system to a memory device of a memory sub-system;
- generating redundancy metadata associated with the host data;
- determining, based on data, obtained from a data structure associated with the memory sub-system, that corresponds to the host data, at least a first status associated with the host data;
- updating the redundancy metadata associated with the host data to indicate at least the first status associated with the host data; and
- performing a memory access operation to write the host data and the updated redundancy metadata to the memory device.

15. The non-transitory computer-readable storage medium of claim 14, wherein the redundancy metadata associated with the host data comprises one or more parity bits.

16. The non-transitory computer-readable storage medium of claim 15, wherein updating the redundancy metadata associated with the host data comprises:
- inverting the one or more parity bits of the redundancy metadata.

17. The non-transitory computer-readable storage medium of claim 14, wherein determining at least the first status associated with the host data comprises:
- determining whether the host data of the received request is valid data or invalid data based on a validity attribute of the received request.

18. The non-transitory computer-readable storage medium of claim 17, wherein determining whether the host data of the received request is valid data or invalid data based on the validity attribute of the received request comprises:
- determining whether the received request comprises a notification indicating that the host data is invalid data;
- responsive to determining that the received request comprises the notification indicating that the host data is invalid data, determining that the host data is invalid data; and
- responsive to determining that the received request does not comprise a notification indicating that the host data is invalid data, determining that the host data is valid data.

19. The non-transitory computer-readable storage medium of claim 14, wherein the operations further comprise:
- determining one or more second statuses associated with the host data, wherein the redundancy metadata is further updated to indicate the determined one or more second statuses.

20. The non-transitory computer-readable storage medium of claim 14, wherein programming the host data and the updated redundancy metadata to the memory device comprises:
- encoding the host data and the updated redundancy metadata based on an error correction mechanism, wherein the encoded host data and encoded redundancy metadata are programmed to the memory device.

* * * * *